US005236760A

United States Patent [19]

Jinn

[11] Patent Number: 5,236,760

[45] Date of Patent: Aug. 17, 1993

[54] MULTIFUNCTION WALL DEVICE

[76] Inventor: Felix Jinn, 9th Fl.-8, No. 1, Lane 126, Sec. 1, Fuhsing S. Rd., Taipei, Taiwan

[21] Appl. No.: 694,251

[22] Filed: May 1, 1991

[51] Int. Cl.[5] .............................................. B32B 3/06

[52] U.S. Cl. ...................................... 428/100; 24/331; 24/346; 24/499; 24/563; 248/229; 248/231.5; 248/231.8; 248/316.5; 248/316.7

[58] Field of Search ............ 428/100; 248/229, 316.5, 248/316.7, 231.5, 231.8; 24/335, 336, 331, 329, 327, 343, 346, 499, 511, 563

[56] References Cited

U.S. PATENT DOCUMENTS

| | | | |
|---|---|---|---|
| 925,828 | 6/1909 | Newton | 24/511 |
| 4,157,152 | 6/1979 | Blastic | 24/243 |
| 5,002,249 | 3/1991 | Meyer | 248/316.7 |
| 5,058,242 | 10/1991 | Liu | 24/67 R |
| 5,075,935 | 12/1991 | Abdi | 24/511 |

*Primary Examiner*—Ellis P. Robinson
*Assistant Examiner*—Nasser Ahmad
*Attorney, Agent, or Firm*—Bacon & Thomas

[57] ABSTRACT

A multifunction wall device has a hook for hanging articles thereon, a clamp for clamping articles there in, a writing implement retainer, and a removable paper clip. The wall device has an integral pivot apparatus and spring device to eliminate external parts. The wall device can be mounted to any vertical surface.

13 Claims, 3 Drawing Sheets

MULTIFUNCTION WALL DEVICE

BACKGROUND OF THE INVENTION

1. Field of the Invention

The present invention relates to devices fixed to walls that provide a hooking, clipping, or clamping function. More particularly, the present invention relates to a multifunction wall device.

2. Description of Related Art

Conventionally, there are many devices that, when attached to a wall, serve a function, e.g., clip paper, hang a coat, hold envelopes, etc. One such device, a wall clamp, generally comprises a clamp with a spring. A disadvantage of this device is that the spring may become worn, lessening the effect of the clamp. Also, during production, the assembly procedure requires an additional step for the spring, adding to the cost.

Other known devices such as wall hooks and paper clips exist. This wide range of wall-mounted devices each provide a different function. However, there does not exist a single wall device that serves many different functions, eliminating the need for numerous devices.

Therefore, there has been a long and unfulfilled need in the related art for a wall device that performs several functions while minimizing construction steps and costs therefor.

SUMMARY OF THE INVENTION

The present invention provides a wall device that has a hook for hanging articles thereon, a clamping means for clamping articles therein, a retaining means for retaining a writing implement therein, and a removable clipping means for clipping paper, envelopes, and the like therein A pair of integral tension arms provide the necessary force for the clamp, thereby eliminating the need for an additional spring. The removable clipping means eliminates the need for additional paper clips when the papers are needed: the entire clipping means with the papers therein is removed. The minimal construction, i.e., only three pieces being all plastic, greatly reduces production time and costs.

The wall device can utilize any conventional fastening means: screws or nails for a wall, suction cups or adhesives for smooth surfaces such as tile, or magnets for large appliances such as refrigerators or ovens. These additional applications to various surfaces greatly increase the range of use for the multifunction wall device, from the bathroom to the kitchen to the workshop.

Other advantages and features of the present invention will become apparent to those skilled in the art upon reading the following detailed description with appropriate reference to the accompanying drawings.

DETAILED DESCRIPTION OF THE PREFERRED EMBODIMENT

Figure 1:
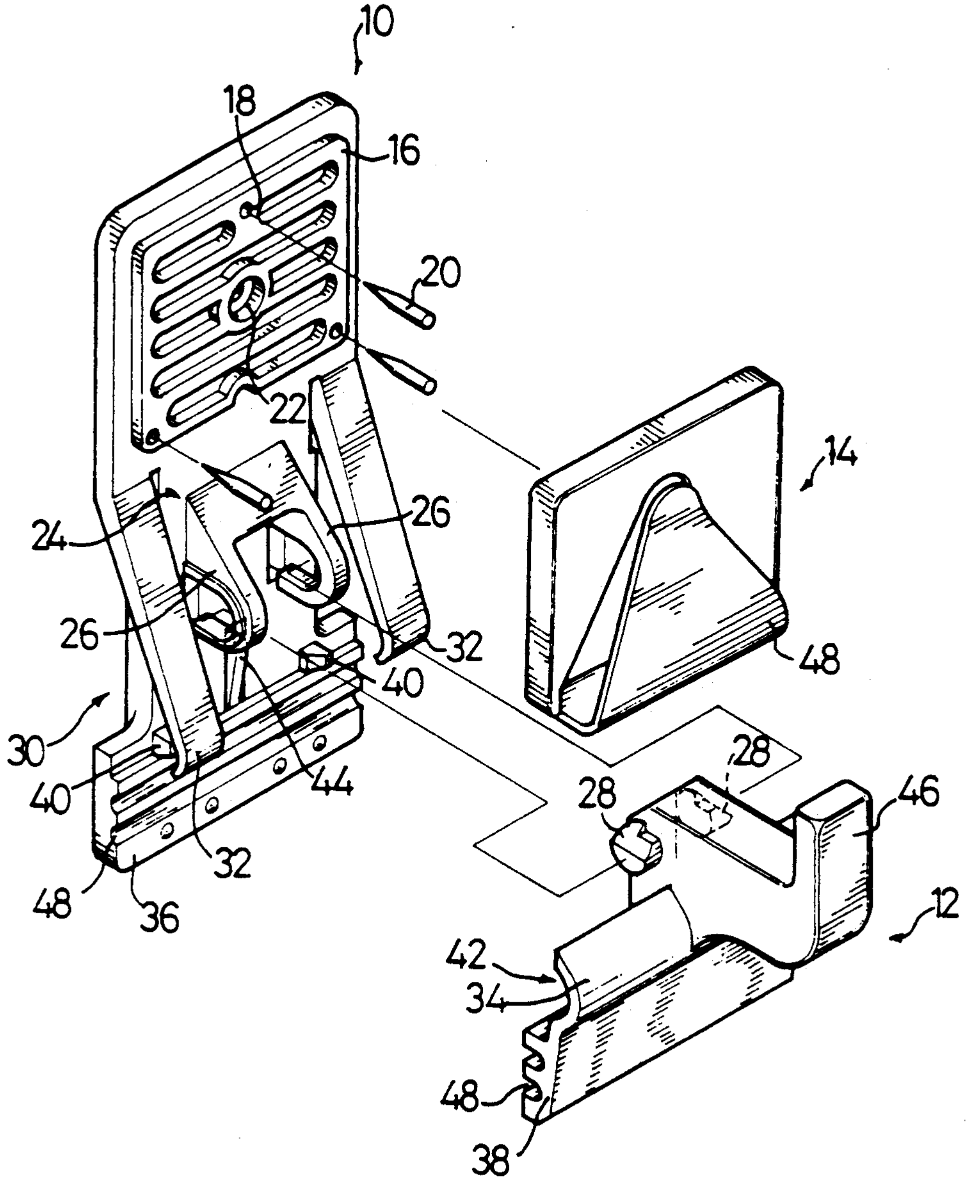
FIG. 1 is an exploded view of a multifunction wall device of the present invention shown in a preferred embodiment.

Now referring to the drawings, particularly to FIG. 1, a multifunction wall device is shown and comprises a wall plate 10, a pivoting member 12, and a clipping means 14. The wall plate 10 has an elevated seat 16 on an upper portion thereof which has a plurality of through holes 18 for receiving a corresponding number of fastening means 20 such as screws or nails. The clipping means 14 is releasably engageable on the elevated seat 16. The elevated seat 16 could further have a central through hole 22 for receiving a single fastening means.

Integral on a midportion of the wall plate 10 is a pivot means 24 comprising a pair of hooked seats 26 which pivotally receive a pair of axles 28 of the pivoting member 12. Also formed on a midportion of the wall plate 10 is a spring means 30 comprising a pair of tension arms 32. The tension arms 32 contact an outer surface of a hub 34 of the pivoting member 12, such that the amount of tension is proportional to the amount of rotation of the pivoting member 12.

On a lower portion of the wall plate 10 is a stationary clamp 36 of a clamping means A corresponding pivotal clamp 38 of the clamping means is integral with the pivoting member 12.

Figure 3:
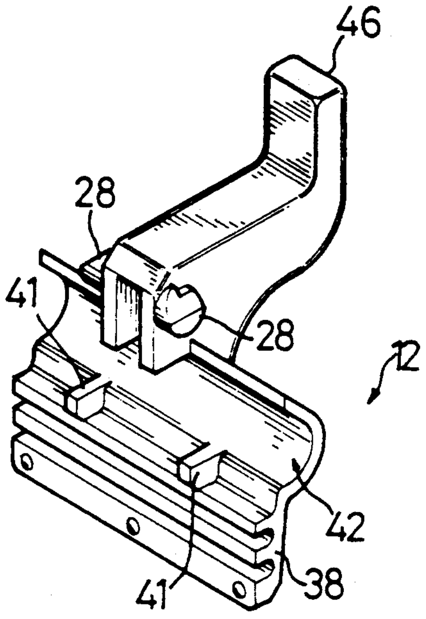
FIG. 3 is a perspective view of a pivoting member of the wall device, showing an inside thereof.

Disposed on the lower portion of the wall plate 10 and pivoting member 12, just above the stationary and pivotal clamps 36 and 38, is an aligning means. The aligning means comprises a pair of primary blocks 40 and a corresponding pair of secondary blocks 41 on an inner surface of the pivoting member 12, as shown in FIG. 3. The primary blocks 40 each have a beveled inside surface, so that as the pivoting member 12 closes, the secondary blocks 41 contact the beveled surfaces of the primary blocks 40, thereby guiding the pivoting member 12. Therefore, the aligning means insures that the stationary and pivotal clamps 36 and 38 align, preventing any clock-like rotation of the pivoting member 12 when in a closed position.

The hub 34 defines a receiving space 42 on an inner side thereof for receiving a writing implement such as a pen or pencil therein. A tension means 44 is formed in the midportion of the wall plate 10 to provide tension to aid in securing the writing implement in the receiving space 42. The receiving space 42 and the tension means 44 generally comprise a retaining means.

The pivoting member 12 further comprises a hook 46 integral therewith. The hook 46 can be used to hang a coat or the like thereon The hook 46 also functions as a lever arm for a user to press on to rotate the pivoting member 12.

The clipping means 14 comprises a clipping portion 48 that tensionally retains papers, envelopes, or the like therein.

Figure 2:
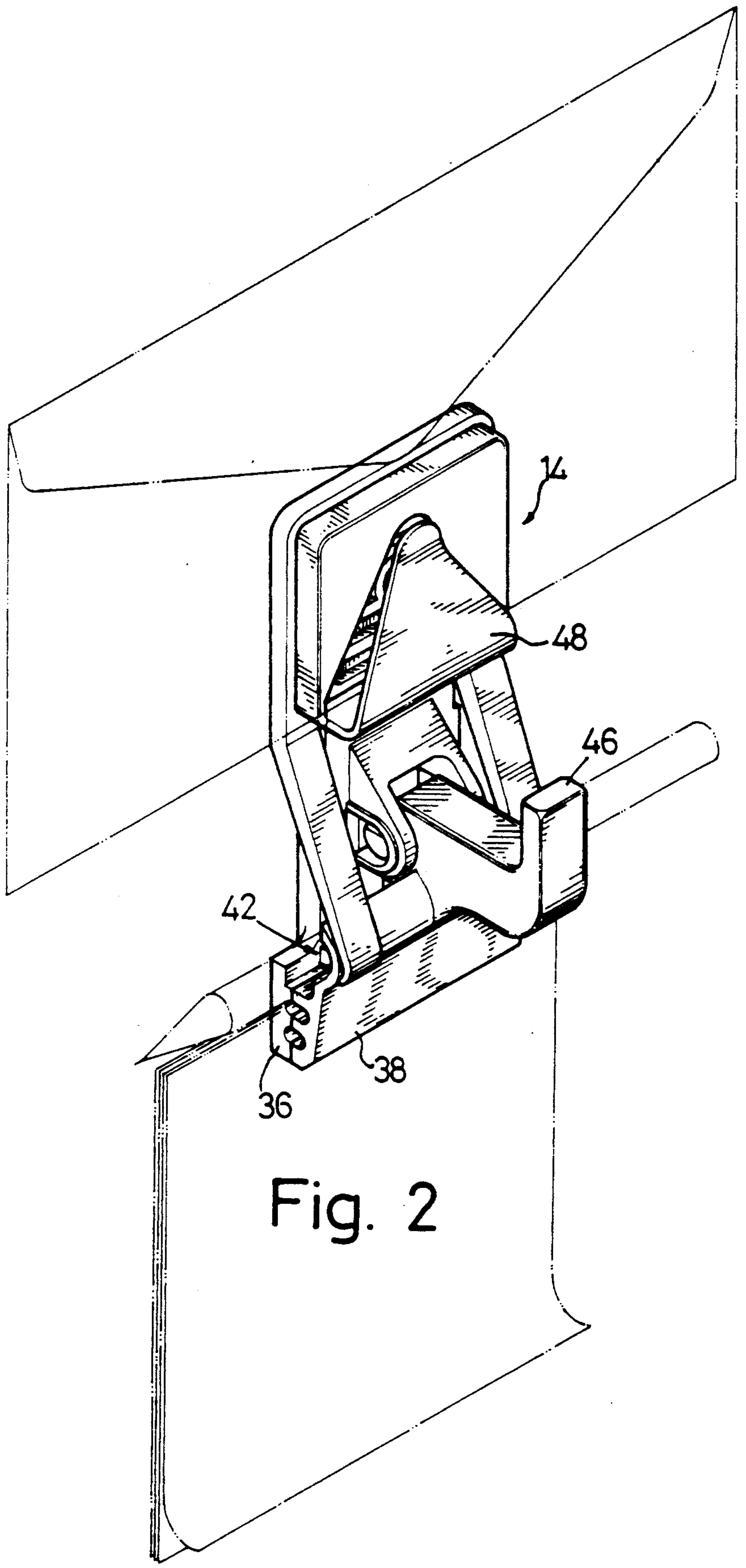
FIG. 2 is a perspective view of the wall device shown in a working embodiment.

FIG. 2 illustrates a possible working embodiment of the wall device according to the present invention. An envelope, a pencil, and a note pad are shown in phantom line, being respectively retained by the clipping means 14, the receiving space 42 of the retaining means, and the stationary and pivotal clamps 36 and 38 of the clamping means. It can be seen that a top portion of the clipping portion 48 of the clipping means 14 flares outward to facilitate the insertion of the envelope. The hook 46 is pressed inward to separate the stationary and pivotal clamps 36 and 38 to insert the note pad. The pencil is simply inserted transversely into the receiving space 42, point first, urging the tension means 44 (cf. FIG. 1) inward, thereby securely holding the pencil in the receiving space 42. The hook 46 is still free to be used as a coat hook or the like.

Another possible working embodiment of the present invention not shown in the drawings is the stationary and pivotal clamps 36 and 38 retaining a rectangular hanger used for hanging skirts, neckties, etc. thereon. Grooves 48 formed in the stationary and pivotal clamps 36 and 38 are sized such as to securely retain a wire portion of the hanger. In this embodiment, the wall device is greatly expanded to accommodate a large amount of articles.

The wall device can easily be fastened to all types of surfaces: suction cups or adhesive tape could be formed on a back surface of the wall plate 10 for fastening the wall device to smooth surfaces such as tile, or a magnet, could be substituted for the adhesive tape for fastening to large appliances such as refrigerators.

A multifunction wall device has been described. It is to be understood, however, that even though numerous characteristics and advantages of the present invention have been set forth in the foregoing description, together with details of the structure and function of the invention, the disclosure is for illustrative purposes only, and modifications may be made in detail, especially in matters of shape, size, and arrangement of parts within the principles of the invention to the full extent indicated by the broad general meaning of the terms in which the appended claims are expressed.

I claim:

1. A multifunction wall-mounted device comprising a pivotal clamping means for releasably clamping articles thereon and having means for maintaining said clamping means in a closed position, which clamping means includes a hooked portion, a retaining means for releasably retaining a writing implement therein, and a removable clipping means for releasably clipping at least one piece of paper therein, the hooked portion, retaining means and clipping means being carried by the clamping means.

2. A multifunction wall-mounted device comprising a wall plate for attachment to a wall and having an upper portion and a lower portion, a pivotal member carried by said lower portion the wall plate to define a clamping means, means for maintaining said clamping means in a closed position, for releasably clamping articles therein, and the wall plate further including a hook portion carried by the pivotal member, a retaining means for releasably retaining a writing implement therein and a removable clipping means for releasably clipping at least one piece of paper therein carried by said upper portion of the wall plate.

3. The wall device as claimed in claim 1, further comprising a spring means for urging said clamping means to be in a closed position.

4. The wall device as claimed in claim 2, further comprising a spring means for urging said pivoting member to be in a closed position.

5. The wall device as claimed in claim 4, wherein said spring means comprises a pair of tension arms integral with said wall plate, said tension arms contact an outside surface of said pivoting member, thereby urging said pivoting member to be in said closed position.

6. The wall device as claimed in claim 5, wherein said clamping means comprises a stationary clamp formed on a bottom portion of said wall plate and a corresponding pivotal clamp formed on a bottom portion of said pivoting member, so that said stationary clamp and said pivotal clamp are flush when said pivoting member is in said closed position.

7. The wall device as claimed in claim 2, wherein said retaining means comprises a hub formed in said pivoting member, said hub defines a receiving space, so that a writing implement is releasably receivable therein.

8. The wall device as claimed in claim 7, wherein said retaining means further comprises a tension means for providing tension in securely retaining the writing implement in said receiving space.

9. The wall device as claimed in claim 2, wherein said clipping means comprises a clipping portion, said clipping portion is integrally and resiliently formed on said clipping means, so that at least one piece of paper is releasably receivable therein.

10. The wall device as claimed in claim 2, wherein said wall plate has an elevated seat formed thereon, such that said clipping means is releasably engageable with said elevated seat.

11. The wall device as claimed in claim 6, further comprising an aligning means for aligning said pivotal clamp with said stationary clamp.

12. The wall device as claimed in claim 11, wherein said aligning means comprises a pair of primary blocks transversely formed on said wall plate and a corresponding pair of secondary blocks transversely formed on said pivoting member, each said primary block has a beveled inside surface, so that when said pivoting member is closing, said secondary blocks contact said beveled inside surfaces of said primary blocks.

13. The wall device as claimed in claim 6, wherein said stationary clamp and said pivotal clamp have at least one transverse groove formed therethrough, so that a rectangular wire hanger is receivable in said grooves when said clamping means is in said closed position.

* * * * *